United States Patent Office 2,898,267
Patented Aug. 4, 1959

2,898,267

EMULSIFIABLE TOXICANT COMPOSITIONS AND EMULSIFYING AGENTS THEREFOR

Paul L. Lindner, Chicago, Ill., assignor, by mesne assignments, to Witco Chemical Company, Inc., New York, N.Y., a corporation of Delaware No Drawing. Application September 7, 1955
Serial No. 533,027

19 Claims. (Cl. 167—42)

The present invention relates to improvements in emulsions of water-insoluble toxicants or pesticides primarily intended for agricultural use for the control and elimination of pests infecting animals or plants, undesirable plants and the like, and to emulsifying agents for use in connection therewith.

In recent years a large number of organic, oil-soluble toxicant materials have been found to have beneficial use in the elimination of animal, vegetable and fungous pests, such substances being used as insecticides, insect repellents, fungicides, rodenticides, acaricides, nematocides, molluscicides, herbicides, etc. Such substances are ordinarily soluble in organic solvents. In use, however, they are generally applied in highly dispersed form in aqueous suspensions or emulsions, generally by spraying.

For convenience in handling and marketing such toxicant substances, they are commonly supplied in admixture with emulsifying agents in the form of concentrates. Before use, these concentrates are admixed with water to secure a liquid suspension or dispersion containing the desired concentration of the toxicant, the spray liquid being then transferred to tanks of suitable size for use with the spraying equipment available to the user, or to dipping vats for treating animals. The spraying equipment may vary from small hand sprayers to spraying equipment of very large size.

The ordinary use of such materials in farm and household applications places severe demands upon the emulsifiers which are used for effecting the dispersion of the toxicant substances. When a concentrate containing the toxicant, usually with an organic solvent therefor, and the emulsifier is added to water in the desired proportions, it is important that there be a rapid, indeed, almost spontaneous dispersion of the toxicant material so that relatively little stirring or agitation, if any, is necessary. Furthermore, since the water to which the concentrate is added may vary widely in hardness, depending upon local conditions, it is necessary that the emulsifying agent be such that the desired rapid dispersion is effected in the available water of given hardness.

The emulsifiers hitherto found to be most satisfactory have in general been mixtures of anionic and non-ionic emulsifiers. The anionic emulsifier is usually a sulfonate of an alkyl aromatic hydrocarbon or phenol or a petroleum sulfonate, and it has been found that rapid dispersion may be secured when the anionic emulsifier is a sulfonate of a polyvalent metal, and particularly of one of the alkaline earth metals such as calcium, barium or magnesium. However, it has been found that when using such emulsifying agents in which the anionic constituent is an alkaline earth metal salt, there is occasionally a tendency to flocculate or to form sludge in the concentrate in the case of many toxicants, such as formulations of 2,4-D and 2,4,5-T esters, butoxy-polypropoxy-propanol, etc. Such flocculation may occur for a variety of reasons, such as presence in the toxicant material of minor amounts of unreacted acidic materials, decomposition products, unremoved catalysts and the like.

Such flocculation or sludge formation is highly undesirable for a number of reasons. The sludge particles tend to clog the spray nozzles and make the spraying operation inefficient as well as necessitating the stopping of the spraying operation to clean the equipment. A further difficulty arising out of such sludge formation is that it leads to lack of uniformity in composition of the spray liquid and introduces unknown factors into its use. The sludge tends to settle out and carry with it an indeterminate proportion of the active toxicant material so that the remaining operable liquid has a variable concentration and the user has no means of knowing what the effective concentration of the concentrate may be at the time of use, particularly when the concentrate has been allowed to stand quiescent for an appreciable period of time. As will be pointed out more fully hereinafter, by employing the mixed emulsifying agents in accordance with the present invention, not only are the desirable features of the emulsifying agents as hitherto employed in the art retained, but also the tendency to sludge formation and to flocculation is avoided and dependable spraying liquids are secured in which the concentration of the toxicant is uniform and known to be effective.

The toxicants, in the use of which the present invention is employed, may serve a wide variety of purposes. Typical of such materials are, for example, DDT (dichloro-diphenyl-trichloroethane, 2,4-D (2,4-dichlorophenoxy-acetic acid) and 2,4,5-T (2,4,5-trichlorophenoxy-acetic acid) and their esters, particularly the lower alkyl esters, gamma-hexachloro-cyclohexane, Aldrin (1,2,3,4,10,10-hexachloro-1,4,4a,5,8,8a-hexahydro-1,4,5,8-dimethano-naphthalene), Chlordane (1,2,4,5,6,7,8,8-octachloro-2,3,3a,4,7,7a-hexahydro-4,7-methanoindene), Dieldrin (1,2,3,4,10,10-hexachloro-6,7-epoxy-1,4,4a,5,6,7,8,8a-octahydro-1,4,5,8-dimethanonaphthalene) and its isomer Endrin, Methyl Parathion (O,O-dimethyl-O,p-nitrophenyl thiophosphate), Parathion (O,O-diethyl-O,p-nitrophenyl thiophosphate), Chlorthion (O,O-dimethyl-O-p-nitro-m-chloro-phenyl thiophosphate), Toxaphene (chlorinated camphene containing 67–69% chlorine), Malathion (O,O-dimethyl dithiophosphate of diethyl mercaptosuccinate), Chloranil (2,3,5,6-tetrachloro-p-benzoquinone), etc. A large number of such toxicants, with their accepted names and chemical structures, as now officially recognized, are given in Soap and Sanitary Chemicals, January 1953, pages 127, 129, 131 and 137. In the following examples reference is made to certain of these toxicants. It will be understood, however, that the present invention may be applied to all such organic toxicants, those specifically referred to in the examples hereinbelow being illustrative of their use and of the normal variations in connection therewith.

The toxicants are, in commercial products, generally accompanied by greater or less proportions of inactive materials resulting from their methods of manufacture, and by organic, water-insoluble solvents, usually aliphatic or aromatic hydrocarbons. As pointed out hereinbefore, the presence of these materials, in many cases, leads to sludge formation when using emulsifying agents as hitherto proposed.

The emulsifiers used in accordance with the present invention comprise a mixture containing both an anionic and a nonionic surface active agent. The nonionic component may be any of the nonionic surface active agents of the types hitherto used in the emulsifying mixtures of the prior art, in which the hydrophilic and lipophilic groups are so balanced as to provide at least ready water dispersibility. Suitable nonionic surface active agents are more fully disclosed hereinafter. It will be understood, however, that any of the known or available nonionic surface active agents that contain sufficient hydrophilic groupings to make them at least water-dispersible may be employed in carrying out the present invention.

The anionic surface active agents employed in accordance with the present invention are salts of the organic oil-soluble sulfonic acids and particularly the alkyl-aryl mono-sulfonic acids as found in the anionic surface active agents hitherto used in the form of their alkali metal, alkaline earth metal and other polyvalent metal salts in emulsifying agents. However, it has now been found that, by the use of polyamine salts of such acids in place of part or preferably all of the metal salt as hitherto used, the dispersing action of the emulsifying agent or mixture is maintained and at the same time, the sludge forming tendencies of the emulsifying agent in concentrates are greatly reduced or entirely eliminated. Anionic surface active agents suitable for the purposes of the present invention are more fully described hereinafter.

Nonionic surface active agents for use in accordance with the present invention may suitably be adducts or derivatives of a polyoxyalkylene glycol and more particularly a polyoxyethylene glycol, or mixed polyoxyethylene-polyoxypropylene glycol. The number of oxyethylene groups present in the compound should be sufficient to impart water dispersibility or water solubility and as is well understood in the art, the number of such groups present in the compound may vary within wide limits and in general, the greater the number of carbon atoms of the lipophilic radical contained in the compound with which the oxyalkylene groups are combined or condensed, the greater the number of oxyethylene groups required to impart a desired degree of water solubility or dispersibility. The nonionic surface active agent may contain from 4 to 45 or more oxyalkylene groups. In the preferred embodiment of the invention, from about 8 to about 30 oxyalkylene groups and particularly oxyethylene groups are present.

In the nonionic surface active agent used in accordance with the present invention, the polyglycol portion of the molecule is combined or condensed with a higher molecular weight radical selected from the group including compounds which contain an alkyl or alkylene group containing from at least 6 carbon atoms and preferably from 8 to 30 carbon atoms, and compounds which contain a chain of polyoxypropylene groups with terminal polyoxyethylene groups (commercially available as "Pluronics"), preferably with molecular weights in the range from 600 to 4,000. The high molecular weight radical may suitably be derived from a compound having a terminal group containing a reactive hydrogen atom, and may thus be an alcohol, phenol, mercaptan, acid, acid amide, sulfamide or the like. Thus, polyethylene oxide adducts of fatty acids, fatty alcohols, higher alkyl mercaptans, alkyl phenols, fatty acid amides, polypropylene glycol, mixed polyoxypropylene and polyoxyethylene polymers or "Pluronics" of molecular weights of 600 to 4,000, and mono-ethers of polypropylene glycol or polybutylene glycol with hydroxy-alkyl, hydroxy-aryl or alkyl-hydroxy-aryl compounds may be used.

In the case of the condensation products of the polyalkylene oxide with fatty acids, the acyl radical may be derived from any one or from mixtures of the fatty acids such as caprylic, capric, lauric, myristic, palmitic, stearic, oleic, linoleic, linolenic and other fatty acids, or mixtures of fatty acids derived from animal or vegetable sources such as lard, tallow, marine oils, coconut oil, babassu oil, soybean oil, peanut oil, cottonseed oil, and the like, or from waxes, such as beeswax, candelilla wax, spermaceti and the like; and partial or complete hydrogenation products derived from any one or more of the foregoing fatty acids, carboxylic acids resulting from the oxidation of petroleum and petroleum waxes, oxidized or polymerized higher fatty acids, abietic acid and other acids derived from rosin, hydroxy fatty acids such as hydroxy stearic acid, dihydroxy fatty acids and the like. The acids may be straight chain or branch chain and may be unsaturated or saturated. The number of carbon atoms in such acids may be from 6 to 30 and in general it is preferred that it be in the range from 10 to 22. In such adducts the polyoxyethylene chain may contain from 5 to 45 and preferably from 12 to 30 oxyethylene groups.

The condensation products of the polyalkylene oxides with fatty alcohols and mercaptans are ether or thio-ether-linked and the lipophilic portion of the molecule may be derived from the alcohols and mercaptans corresponding to the fatty acids referred to above. In such adducts, it is preferred that the alkyl group of the alcohol or mercaptan have from 9 to 22 carbon atoms and that the polyoxyethylene chain contain from 8 to 40 oxyethylene groups.

As hereinbefore noted, the nonionic surface active agents employed may also be adducts of polyalkylene oxides with mono and dialkyl phenols or acyl phenols in which the substituting alkyl or acyl group may have from 6 to 25 carbon atoms and preferably from 8 to 18, as for example, diisobutyl phenol, diamyl phenol, hexyl-heptyl phenol, iso-octyl phenol, nonyl phenol, dinonyl-phenol, dodecyl phenol, p-tert-octyl phenol and the like. In such adducts, from 8 to 40 oxyethylene groups and preferably from 9 to 30 may be present in the polyoxyethylene chain. Similarly, polyoxyethylene adducts having 9 to 30 mols ethylene oxide with mono and di-alkyl naphthols having 5 to 18 carbon atoms in the alkyl chain or chains, such as iso-octyl naphthol, tri-isobutyl-beta-naphthol and di-amyl naphthol may be used. Condensation products of the polyalkylene oxides with complex phenols such as those secured by condensation of simple phenols with aldehydes or ketones, for example, tridecyl-para-hydroxy-phenyl ketone and alkyl cyclohexanone may also be employed.

Other nonionic surface active agents which may be employed are the adducts of polyoxyethylene with propylene oxide condensates, propylene oxide and ethylene oxide condensates and propylene oxide-alcohol condensates of molecular weight of from about 600 to about 4,000, preferably from about 600 to about 2,000, such as those commercially available under the trade names "Pluronics" and "Tergitols," and also the polyoxyethylene adducts of partial fatty acid esters of polyhydric alcohols having 3 to 6 carbon atoms.

Many nonionic surface active agents of the types hereinbefore referred to are well known in commerce and may be employed in accordance with the present invention. Typical examples of such polyglycol derivatives are the following:

Polyglycol ethers of nonyl phenol, containing 10, 12, 15 and 20 oxyethylene groups.

Polyoxyethylene ethers of dodecyl phenol containing 10 oxyethylene groups.

Polyoxyethylene esters (mono- and/or di-) of stearic acid containing 9 oxyethylene groups.

Polyoxyethylene esters (mono- and/or di-) of tall oil fatty acids containing 5, 14 and 22 oxyethylene groups.

Polyoxyethylene glycol ethers of dodecyl naphthol containing 20 oxyethylene groups.

Polyoxyethylene compound with coconut oil fatty acid amides containing 7 ethylene oxide groups.

Polyoxyethylene compound with oleic acid amide containing 30 ethylene oxide groups.

Polyoxyethylene ethers of cetyl alcohol and stearyl alcohol with 20 to 25 ethylene oxide groups.

Polyoxyethylene ethers of oleyl alcohol with 20 to 25 ethylene oxide groups.

Polyoxyethylene ethers of lauryl alcohol with 5 and with 20 ethylene oxide groups.

Many of the nonionic surface active agents or emulsifiers used in accordance with the present invention are commercially available under various trade names. Thus, various polyoxyethylene ethers of alkyl phenols are known as Antara 400 series; Antarox A-200, Antarox D-100, Igepal CA and CO and the Triton X-100 type. In general the alkyl radical contains from 8 to 18 carbon atoms. For example, Triton X-100 designates the adduct of i-octyl phenol principally with 10 to 11 mols ethylene oxide. Various fatty acid esters of polyoxyethylene are known as Antarox B-100; Antarox B-201, 209, Emcol H-30, Emulphor EC, ELA and AG oil-soluble, Ethofats, Lipals, Neopals, Nopalco, and Myrj. Among the commercial fatty alcohol ethers of polyoxyethylene ethers are those known as Antarox D-100 and the Brij series. The Tween series are polyoxyethylene ethers of partial higher fatty acid esters of sorbitan and anhydro-sorbitan respectively. The Ethofats and Ethomids are polyoxyethylene adducts of fatty acids and fatty acid amides respectively. A thioether or adduct of polyoxyethylene and an alkyl mercaptan (tert-dodecyl mercaptan) is commercially available under the name Nonic 218.

Compounds of the character above referred to are generically termed "alkylene oxide adducts" or ethylene oxide adducts" in the art. It will be understood that, in general, the commercial products are mixtures of compounds containing different numbers of alkylene oxide groups or "mols" of alkylene oxide, of which one predominates, being accompanied by smaller proportions of adducts containing larger and smaller numbers of the alkylene oxide groups in the polyoxyethylene portion of the molecule. The products are identified by the number of oxyalkylene groups in the predominant compound present. Thus the term "dodecyl phenol-12 mol ethylene oxide adduct" identifies the adduct (in this case, the ether) in which the predominant constituent is that in which dodecyl phenol is combined with a polyoxyethylene containing 12 ethylene oxide groups.

Anionic emulsifiers or surface active agents which may suitably be employed in accordance with the present invention are the polyamine salts of the preferentially oil-soluble petroleum sulfonic acids and of aromatic monosulfonic acids of the general formula

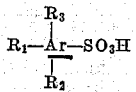

wherein Ar represents an aromatic radical having not more than two rings, $R_1$ represents a radical selected from the group consisting of the alkyl, polyalkyl, alkoxy, alkyl-phenyl, alkyl thio and polypropoxyether radicals, $R_2$ a member selected from the group consisting of the alkyl, phenyl, hydroxy-phenyl, phenyloxy and benzyl radicals, hydrogen and halogen, the total number of carbon atoms in $R_1$ plus $R_2$ being from 8 to 30, and $R_3$ a member selected from the group hydrogen and hydroxyl; and the amine group is one of the class consisting of the alkylene polyamines and alkyl and hydroxyl-substituted alkylene polyamines having up to 16 carbon atoms and having 2 to 4 carbon atoms between their amino groups, amino-hydrooxazines and alkyl-substituted amino-hydrooxazines and heterocyclic compounds having at least one nitrogen in the ring and at least one amino group attached to a carbon atom of the ring.

Particularly suitable for use in accordance with the present invention are the polyamine salts of alkyl substituted aromatic monosulfonic acids wherein the aromatic radical is a benzene or naphthalene radical or a hydroxyl-substituted benzene or naphthalene radical. When the aromatic radical is mononuclear, it is preferred that the alkyl groups have from 8 to 18 carbon atoms; and when the aromatic radical is binuclear, it is preferred that substituting alkyl groups have from 5 to 18 carbon atoms. The polyamine is preferably an alkylene polyamine or an alkyl or alkanol-substituted alkylene polyamine having 2 to 4 carbon atoms between the amine groups.

Examples of the polyamines which may be employed in preparing the anionic emulsifiers for use in accordance with the present invention are the following:

Ethylene diamine, propylene diamine, diethylene triamine, N-3, amino-propyl-morpholine, 2-hydroxyethyl-amino-propyl-morpholine, 3,3-imino-bispropyl-amine, 3-dimethyl-amino-propyl amine, 3-isopropyl-amino-propyl amine, 1,3-diamino butane, amino-ethyl-ethanolamine, amino-pyridines, alkylated amino-pyridines, amino-quinolines, and amino-piperidines.

Examples of the acid radicals of the polyamine salts used as anionic components of the emulsifying agent in accordance with the present invention are those of the alkyl and dialkyl benzene, phenol, cresol, naphthalene and naphthol mono-sulfonic acids having 8 to 18 carbon atoms in the alkyl group and in which the phenol groups, if present, may be free or blocked by acylation or etherification; for example, dodecyl-benzene sulfonic acid, dodecyl-phenol sulfonic acid, dihexyl-benzene sulfonic acid, nonyl-benzene sulfonic acid, keryl-benzene-sulfonic acid (the keryl group containing 10 to 16 carbon atoms), and lauryl-myristyl- and stearyl-benzene sulfonic acids.

Other examples of aromatic mono-sulfonic acids, the polyamine salts of which are useful in accordance with the present invention, are the following:

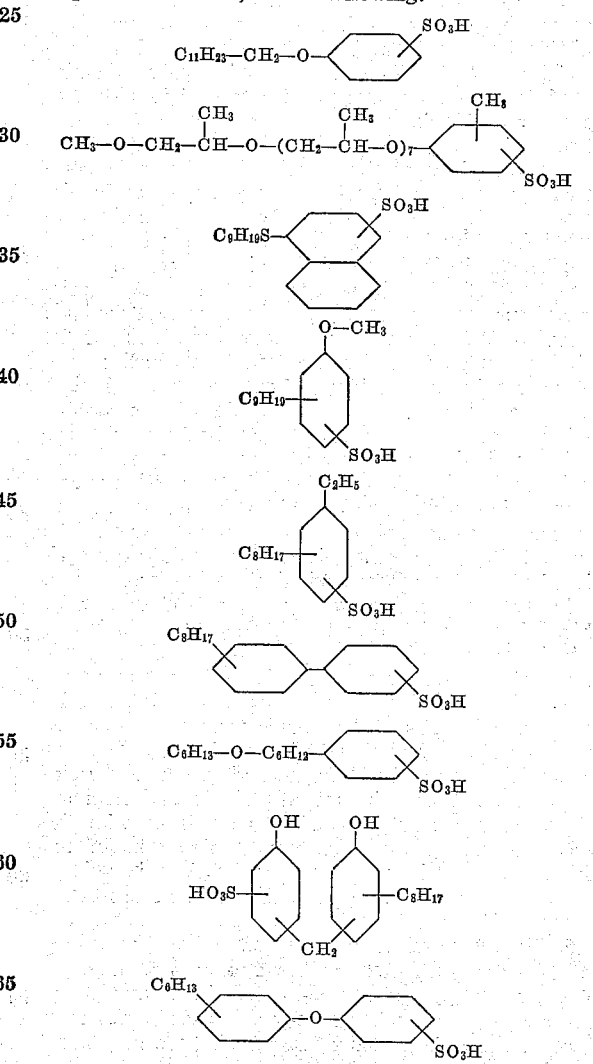

The alkyl radicals present in compounds such as the foregoing may suitably be derived from olefins, polymerized olefins, olefinic fractions resulting from Fischer-Tropsch syntheses, chlorinated hydrocarbons and the like by methods well known in the art. In many cases the alkyl radical represents the predominant one in a mixture derived from a more or less closely fractionated cut of an olefinic mixture resulting from the processes by which they are produced. Preferentially oil soluble petroleum sulfonic acids, such as those known in the art as brown and mahogany petroleum sulfonic acids, may also be used. Such sulfonic acids, in general, have molecular weights in the order of 300 to 800.

Anionic surface active agents which have been found to be particularly effective in carrying out the present invention are those salts in which the amine is an alkylene polyamine or hydroxy-alkylene polyamine having 2 to 4 carbon atoms between their amino groups, such as propylene diamine and amino-ethyl-ethanol-amine, and the acid radical is that of an alkyl benzene or alkyl phenol mono-sulfonic acid with 8 to 18 carbon atoms in the alkyl group, such as dodecyl-benzene mono-sulfonic acid and dodecyl-phenol mono-sulfonic acid.

In preparing emulsifying agents for use in accordance with the present invention, the nonionic component may be either a single one of the nonionic surface active agents hereinbefore referred to or may be a mixture of two or more of such surface active agents. Similarly, the anionic component may be a single one of the anionic surface active agents hereinbefore referred to or may be a mixture of two or more. In many instances, the surface active agents of both types are not commercially available in pure form, but may be employed as commercially available. Thus, a sample of propylene-diamine salt of dodecyl-phenol-mono-sulfonate used in certain of the examples hereinafter set forth was found to have a concentration of about 38% active ingredient. Since the concentrations of these active ingredients in commercial products may vary, in the examples as hereinafter set forth the proportions are based upon the content of the active ingredient in the commercial materials used; i.e. on the basis of 100% active ingredient.

In general, the individual surface active agents or mixtures of surface active agents of the same type (anionic or nonionic) do not form satisfactory emulsions of the toxicants employed, or form concentrates which do not disperse readily and rapidly without excessive agitation. Furthermore, in many cases the emulsions formed on dispersing a concentrate are not sufficiently stable and require continuing agitation during use. They are hence unsuitable for use where the final dilute emulsion is carried in equipment not provided with agitating means, such as aeroplane spray tanks, knapsack spray tanks and the like; and they are also unsuitable for use in other agricultural equipment without agitating means; for example, dipping vats for treating cattle, sheep and other animals. While it has been found that mixtures of the anionic and nonionic surface active agents give more readily dispersible concentrates of the water-insoluble toxicants or toxicant solutions, particularly when polyvalent metal salts such as calcium salts of the anionic surface active agents are employed, these mixtures often tend to form sludges or deposits which make their use undesirable, as hereinbefore noted. The mixtures of anionic and nonionic surface active agents prepared in accordance with the present invention, wherein the polyamine salts of the anionic surface active agents are employed as the anionic component of the mixture, have the desirable properties of very rapid dispersion without excessive agitation, and of stability of the resultant dispersion without the defects due to sludge formation. It has also been found that, when using the polyvalent metal salts of the anionic surface active agents, their sludge-forming tendencies may be substantially eliminated by substituting the polyamine salts of the anionic surface active agents for the polyvalent metal salts to the extent of at least about 40% or more; or in other words, a proportion, preferably less than 50% and in general not more than 60% of the anionic surface active agent may be the polyvalent metal salt. Among the polyvalent salts which may be so employed are, for example, those of calcium, magnesium, zinc, aluminum, manganese, cadmium, strontium and barium. The anionic surface active agent may be in part an alkali metal salt, such as a sodium salt.

The efficacy of the polyamine salts in preventing sludge formation when substituted for the polyvalent metal salts of the anionic surface active agents in suitable proportions as hereinbefore set forth is illustrated by the following example.

A series of concentrates was prepared, using the same proportions of toxicant, solvent and emulsifying agent in each, as follows:

| | Percent |
|---|---|
| Butyl ester of 2,4-D | 78 |
| Kerosene | 17 |
| Emulsifying agent | 5 |

Two emulsifying agent formulations were prepared, one with minor proportions of calcium and sodium salts and with mainly polyamine salts of aromatic sulfonic acids constituting the anionic component and the other with mainly calcium salt and a minor proportion of sodium salt constituting the anionic component. In both the nonionic component was the same, being a mixture containing 89.5% of Tergitol-type compounds and 10.5% of the adduct of nonyl-phenol with 10 mols ethylene oxide. The formulas, designated A and B respectively, were as follows:

A

| | Percent |
|---|---|
| Propylene diamine salt of dodecyl benzene sulfonic acid (DBS acid) | 23.0 |
| Calcium salt of DBS acid | 2.5 |
| Sodium salt of petroleum sulfonic acid | 2.0 |
| Nonionic component | 50.6 |
| Propanol | 15.0 |
| High-boiling aromatic solvent | 6.9 |

B

| | Percent |
|---|---|
| Calcium salt of DBS acid | 29.5 |
| Sodium salt of petroleum sulfonic acid | 1.8 |
| Nonionic component | 47.8 |
| Propanol | 16.0 |
| High-boiling aromatic solvent | 4.9 |

Formulas of intermediate proportions of the polyamine salt in the anionic component were prepared by mixing formulas A and B in varying proportions. These formulas were as follows:

C (9 parts A, 1 part B)

| | Percent |
|---|---|
| Polyamine salt of DBS acid | 20.7 |
| Calcium salt of DBS acid | 5.2 |
| Sodium salt of petroleum sulfonic acid | 2.0 |
| Nonionic component | 50.3 |
| Propanol | 15.1 |
| High-boiling aromatic solvent | 6.7 |

D (3 parts A, 1 part B)

| | |
|---|---|
| Propylene diamine salt of DBS acid | 17.25 |
| Calcium salt of DBS acid | 9.25 |
| Sodium salt of petroleum sulfonic acid | 1.95 |
| Nonionic component | 49.9 |
| Propanol | 15.25 |
| High-boiling aromatic solvent | 6.4 |

E (1 part A, 1 part B)

| | |
|---|---|
| Propylene diamine salt of DBS acid | 11.5 |
| Calcium salt of DBS acid | 16.0 |
| Sodium salt of petroleum sulfonic acid | 1.9 |
| Nonionic component | 49.2 |
| Propanol | 15.5 |
| High-boiling aromatic solvent | 5.9 |

F (1 part A, 3 parts B)

| | Percent |
|---|---|
| Propylene diamine salt of DBS acid | 5.75 |
| Calcium salt of DBS acid | 22.75 |
| Sodium salt of petroleum sulfonic acid | 1.85 |
| Nonionic component | 48.5 |
| Propanol | 15.75 |
| High-boiling aromatic solvent | 5.4 |

G (1 part A, 9 parts B)

| | Percent |
|---|---|
| Propylene diamine salt of DBS acid | 2.3 |
| Calcium salt of DBS acid | 26.8 |
| Sodium salt of petroleum sulfonic acid | 1.8 |
| Nonionic component | 48.1 |
| Propanol | 15.9 |
| High-boiling aromatic solvent | 5.1 |

It is thus apparent that the formulas of this series of emulsifying agents are substantially the same except for the diminishing proportions of the diamine salt and increasing proportions of the calcium salt in the mixtures forming the anionic components of the emulsifying agents. Concentrates using each of these emulsifying agents were prepared according to the formulation given above, and sludge formation in the concentrate noted at the end of one week. The results are shown in the following table. For convenience, the percentage of the diamine salt in the anionic component in each composition is also given in the table.

| Emulsifier | Percent Diamine Salt in Anionic Component | Sludge Formation |
|---|---|---|
| A | 83.6 | None. |
| C | 74.2 | None. |
| D | 60.6 | None. |
| E | 37.4 | Trace. |
| F | 18.9 | Slight. |
| G | 7.6 | Considerable. |
| B | 0 | Heavy. |

The effect of the use of the polyamine salts of the aromatic sulfonic salts in reducing and eliminating sludge formation is clearly illustrated by the foregoing examples. It has been found that in toxicant mixtures tending to form sludges with the polyvalent metal salts of the aromatic sulfonates, with proportions above about 15% of the polyamine salt in the anionic component, sludge formation is greatly reduced, and with proportions of from about 40% to 100% of polyamine salt in the anionic component, sludge formation no longer occurs notwithstanding the fact that the remainder of the anionic component is mainly or entirely the calcium or other polyvalent metal salt.

In carrying out the present invention, the anionic and nonionic emulsifier components as hereinbefore described are admixed in the proportions necessary to secure emulsification and the desired rapid dispersion of the toxicant solution, the resulting concentrate being free from sludge formation on standing. The proportions of the nonionic and anionic components, while they must be in the range which imparts rapid water dispersibility or water solubility, may vary with a number of factors. With increasing hardness of the water with which the emulsion is formed, the relative proportion of the nonionic component is preferably increased, when using the same or similar nonionic and anionic components. The balance of hydrophilic to lipophilic groupings in the molecule of the nonionic component likewise affects the proportions which should be used, lesser proportions of the nonionic component being required as the number of hydrophilic groupings (i.e., alkylene oxide groupings) in its molecule increases. Thus, with the propylene-diamine salt of dodecyl-benzene mono-sulfonic acid as the anionic constituent and with the nonyl-phenol-12 mol ethylene oxide adduct as the nonionic component a satisfactory ratio for use in both hard and soft water for emulsifying a solution of the butyl ester of 2,4-D is 50% nonionic component in the mixture, the minimum ratio for satisfactory use in soft water is about 36% and the maximum ratio for use in very hard water (1000 p.p.m. Ca equivalent) is about 64%. With the same anionic emulsifier and with the nonyl-phenol-15 mol ethylene oxide adduct as the nonionic component, the proportion of the nonionic component in the mixture satisfactory for both hard and soft water is about 41%, the minimum for use with soft water about 28.5% and the maximum for use in the same hard water about 52.5%.

As another illustration, in a mixture in which the anionic component is the amino-ethyl-ethanolamine salt of dodecyl-benzene mono-sulfonic acid and the nonionic component is the nonyl-phenol adduct with 10 mols ethylene oxide, a satisfactory proportion of the nonionic component in the mixture for use with both hard and soft water is about 46% with a minimum of about 25% for soft water and a maximum of about 62% for very hard water. If the number of mols of ethylene oxide in the adduct is increased to 12, these proportions are reduced respectively to about 36.5%, about 16.5% and about 57.5%. If the number of mols of ethylene oxide in the adduct is further increased to 15, the proportions are further reduced respectively to about 25%, about 11% and about 35%. These are with a solution of butyl 2,4-D in kerosene as the solvent. With Toxaphene as the toxicant, and kerosene as the solvent, the proportions of nonionic to anionic components desirable in the mixture are somewhat greater than those required with the butyl-2,4-D ester. When the solvent for the toxicant is aromatic in character, the proportions of nonionic to anionic components desirable are also somewhat greater than with non-aromatic solvents. In general, when the anionic component is an alkylene polyamine salt or a hydroxyalkylene polyamine salt of an alkyl benzene or alkyl-phenol mono-sulfonic acid with 8 to 18 carbon atoms in the alkyl group and the nonionic component is an ether-bonded polyalkylene oxide adduct or specifically a polyethylene oxide adduct of an alkyl-phenol having 8 to 18 carbon atoms in the alkyl group and from 8 to 22 oxyethylene groups, the proportion of the nonionic surface active agent in the mixture of surface active agents will fall within the range of from about 25% to about 75%, basis active ingredients. When the nonionic surface active agent is a polyalkylene adduct of a fatty alcohol or fatty acid with 8 to 22 carbon atoms and from 5 to 20 carbon atoms with such anionic surface active agents, the proportion of the nonionic component will be found to fall within the range from about 15 to about 95% of the mixture of surface active agents, basis active ingredient.

With a long chain fatty acid or fatty alcohol radical in the nonionic component, the proportions of nonionic component desirable in the mixture are increased and again in compositions using such nonionic component, an increase in the number of mols of alkylene oxide present in the nonionic component decreases the proportion of nonionic component required. Thus, with the propylene-diamine salt of dodecyl-phenol mono-sulfonic acid as the anionic component and with the tall oil fatty acid adduct with 5 mols ethylene oxide as the nonionic component, a mixture with 90% of the nonionic component gives satisfactory results in both hard and soft water, the minimum in soft water being about 80% and the maximum in very hard water being about 95%. With the increase in number of the mols of ethylene oxide in the nonionic component to 14, these proportions are reduced respectively to 68.5, 50 and 80. With the aminoethyl-ethanol-amine salt of dodecyl-benzene mono-sulfonate as the anionic component and the lauryl alcohol-ethylene oxide adduct containing about 5 ethylene oxide groups (Brij 30) as the nonionic component, the proportions of nonionic component required in the mixture are about the same as in the preceding example using as the nonionic component the tall oil fatty acid adduct with 5 mols ethylene oxide.

The following examples are illustrative of emulsifier compositions which may be used in preparing concentrates of toxicants in accordance with the present invention. In connection with these examples, ranges of proportions are given for the anionic and nonionic components and also preferred proportions. The ranges of proportions extend from a minimum proportion suitable for use in soft water (0 p.p.m. Ca equivalent) to a maximum of the nonionic constituent suitable for use in very hard water. The term "very hard water" as used herein refers to water artificially prepared with a hardness of 1000 p.p.m. Ca equivalent, which may be considered as representative of natural waters occurring in hard water areas. The preferred proportions or ranges of proportions are suitable for use in connection with the formation of emulsions in water of all degrees of hardness ordinarily encountered. The proportions given are approximate and are subject to minor variations, due in part to the normal variations in the commercial products constituting the sources of the anionic and nonionic components.

*Example 1*

The nonionic component is the nonyl-phenol adduct with 12 mols ethylene oxide. The anionic component is the propylene-diamine salt of dodecyl-benzene mono-sulfonic acid. For use with butyl ester of 2,4-D, dissolved in kerosene, as a toxicant, suitable proportions of the nonionic component are from about 36% to about 64%, a preferred proportion being about 50%. A suitable concentrate for use in accordance with the present invention contains 40% butyl ester of 2,4-D, 57% kerosene and 3% of the mixed emulsifying agent.

Employing the same components for the emulsification of a concentrate containing Toxaphene, with kerosene as the solvent, the range of proportions of the nonionic component in the emulsifying agent is from about 57 to about 76%, a preferred proportion being about 70%.

*Example 2*

An emulsifying agent which contains as its nonionic component the nonyl-phenol adduct of polyoxyethylene containing 15 mols ethylene oxide and as its anionic component the same as is used in Example 1, suitable for use in preparing the concentrate with Toxaphene as the toxicant, and kerosene as the solvent, may contain from about 28% to about 52.5% and preferably about 41% of the nonionic constituent. A readily dispersible concentrate is prepared containing 60% Toxaphene, 37% Varsol (a kerosene cut) and 3% of the emulsifying agent.

*Example 3*

An emulsifying agent is prepared in which the nonionic component is the nonyl-phenol adduct containing 12 mols ethylene oxide and the anionic component is the propylene diamine salt of dodecyl phenol mono-sulfonic acid. In preparing a concentrate with the butyl ester of 2,4-D as the toxicant and kerosene as the solvent, the proportion of nonionic in the emulsifying agent may be from about 40 to about 72.5%, preferably about 63%. A suitable dispersible concentrate in accordance with the present invention is prepared containing 40% butyl ester of 2,4-D, 57% kerosene and 3% of the emulsifying agent.

Using the same components in preparing an emulsifying agent for emulsifying Toxaphene, the range of proportions of the nonionic component may be from about 57% to about 76%, preferably about 70%. A suitable concentrate for use in accordance with the present invention may be prepared containing 60% Toxaphene, 37% mineral spirits and 3% of the emulsifying agent.

*Example 4*

An emulsifying agent is prepared in which the nonionic component is the adduct of tall oil fatty acids with 5 mols ethylene oxide and the anionic component is the propylene diamine salt of dodecyl-phenol mono-sulfonic acid. In preparing an emulsifying agent for use with the butyl ester of 2,4-D as a toxicant, the proportion of the nonionic constituent in the emulsifying agent may be from about 80% to about 95% and is preferably about 90%. A suitable concentrate in accordance with the present invention contains 3% of the emulsifying agent with 40% of the toxicant and 57% kerosene.

Using the same anionic component and the adduct of tall oil fatty acids with 14 mols ethylene oxide as the nonionic component, the proportion of the latter may be from about 50 to about 80% and is preferably about 68.5%. A suitable dispersible, nonsludge forming concentrate may be formed, using 3% of this emulsifying agent with 40% butyl ester of 2,4-D and 57% kerosene.

*Example 5*

An emulsifying agent is prepared containing as the nonionic component the adduct of iso-octyl phenol with 12 mols ethylene oxide and as the anionic component the propylene-diamine salt of mahogany petroleum sulfonate. In preparing an emulsifying agent for use with the butyl ester of 2,4-D, the proportion of the nonionic component in the emulsifying agent is in the range from about 72 to about 96% and is preferably about 92.5%. A suitable dispersible, nonsludging concentrate may be formed using 40% of the butyl ester of 2,4-D, 50% kerosene and 10% emulsifying agent.

*Example 6*

An emulsifying agent is prepared in which the nonionic component is the adduct of nonyl-phenol with 15 mols ethylene oxide and the anionic component is the ethylene-diamine salt of dodecyl-benzene mono-sulfonic acid. Approximately equal parts were used in preparing the emulsifying agent. A satisfactory dispersible concentrate was prepared containing 60% Toxaphene, 37% kerosene and 3% of the emulsifying agent.

*Example 7*

An emulsifying agent was prepared containing as the nonionic component the adduct of nonyl-phenol with 12 mols ethylene oxide and as the anionic component the diethylene triamine salt of dodecyl benzene mono-sulfonic acid. Equal parts of the nonionic and anionic components were used. A satisfactory dispersible, nonsludge forming concentrate was prepared containing 40% butyl ester of 2,4-D, 57% kerosene and 3% of the emulsifying agent.

*Example 8*

An emulsifying agent was prepared containing as the anionic component the adduct of nonyl-phenol with 10 mols ethylene oxide and as the anionic component the aminoethyl-ethanolamine salt of dodecyl-benzene mono-sulfonic acid. For use in emulsifying the butyl ester of 2,4-D, a suitable range of proportions of the nonionic component in the mixture is from about 25 to about 62%, preferably about 46%. A satisfactory dispersible, nonsludge forming concentrate was formed containing 40% butyl ester of 2,4-D, 57% kerosene and 3% of the emulsifying agent.

*Example 9*

An emulsion is prepared containing as the nonionic component the adduct of nonyl-phenol with 12 mols ethylene oxide and the same anionic component as is used in Example 8. In preparing an emulsifying agent for use with butyl ester of 2,4-D, a suitable range of proportions for the nonionic component is from about 16.5 to about 57.5%, preferably about 37%. A satisfactory dispersible, nonsludge forming concentrate may be formed containing 40% butyl ester of 2,4-D, 57% kerosent and 3% of the emulsifying agent.

Using the same constituents in preparing a concentrate containing Toxaphene as the toxicant, the nonionic component may be in the range of from about 31 to about 67%, preferably about 52.5%. A satisfactory dispersible concentrate may be prepared containing 60% Toxaphene, 37% kerosene and 3% emulsifying agent.

*Example 10*

An emulsifying agent is prepared containing as the nonionic component the adduct of nonyl-phenol with 15 mols of ethylene oxide, and as the anionic component the aminoethyl-ethanolamine salt of dodecyl-benzene mono-sulfonic acid. In preparing an emulsifying agent for use with the butyl ester of 2,4-D, the proportion of the nonionic component in the mixture may be from about 11 to about 35%, preferably about 25%. A satisfactory dispersible, nonsludge forming concentrate is prepared containing 40% butyl ester of 2,4-D, 57% kerosene and 3% of the emulsifying agent.

Using the same constituents, in preparing an emulsifying agent for emulsifying Toxaphene, the proportion of the nonionic component in the mixture may be from about 31% to about 60%, preferably about 43%. A satisfactory concentrate is formed containing 60% Toxaphene, 37% kerosene and 3% of the emulsifying agent.

*Example 11*

An emulsifying agent is prepared containing as the nonionic component the adduct of nonyl-phenol with 20 mols ethylene oxide, the anionic component being the same as in the preceding example. In preparing an emulsifying agent for use with Toxaphene, the proportion of the nonionic component in the mixture may be from about 28.5% to about 47.5%, preferably about 42%. A satisfactory dispersible concentrate is prepared containing 60% Toxaphene, 37% kerosene and 3% of the emulsifying agent.

*Example 12*

An emulsifying agent is prepared in which the nonionic component is the adduct of lauryl alcohol with about 5 mols ethylene oxide (known commercially as Brij 30). The anionic component is the amino-ethyl-ethanolamine salt of dodecyl-benzene mono-sulfonic acid. In an emulsifying mixture for emulsifying the butyl ester of 2,4-D, the proportion of the nonionic component is from about 75 to about 92.5%, preferably about 89%. A suitable nonsludge forming concentrate for forming a readily dispersible emulsion is made up of 40 parts of butyl ester of 2,4-D, 56 parts kerosene and 4 parts of the emulsifying agent.

In an emulsifying agent in which the nonionic component is an adduct of lauryl alcohol with 20 mols ethylene oxide, known as Brij 35, and the anionic component is the same as set forth in the preceding paragraph, the proportions of the nonionic surface active agent suitable for emulsifying Toxaphene are from about 15% to about 34%, preferably about 25%. A suitable concentrate which is highly dispersible is prepared containing 60 parts Toxaphene, 37% kerosene and 3% of the emulsifying agent.

*Example 13*

An emulsifying agent is prepared in which the nonionic component is the adduct of dodecyl-phenol with 10 mols ethylene oxide and the anionic component is the same as in the preceding example. In preparing an emulsifying agent for use with the butyl ester of 2,4-D as a toxicant, the proportion of the nonionic component may be from about 37.5% to about 70%, preferably about 57.5%. A satisfactory concentrate which is highly dispersible and nonsludge forming may be formed containing 40% butyl ester of 2,4-D, 57% of kerosene and 3% of the emulsifying agent.

*Example 14*

An emulsifying agent is prepared in which the nonionic component is the adduct of dinonyl-phenol with 12 mols ethylene oxide and the anionic component is the same as in the preceding example. In preparing an emulsifying agent suitable for use with butyl ester of 2,4-D as a toxicant, the proportion of the nonionic component may be from about 45 to about 71.5%, preferably about 62.5%. A satisfactory nonsludge forming, readily dispersible concentrate suitable for use with butyl ester of 2,4-D as a toxicant may be prepared containing 40% of the toxicant, 57% of kerosene and 3% of the emulsifying agent.

*Example 15*

An emulsifying agent is prepared in which the nonionic component is the material known commercially as Tergitol XC, which is an adduct of butylalcohol-propylene oxide and ethylene oxide, and the anionic component is the same as in the preceding example. In preparing an emulsifying agent suitable for emulsifying DDT, the proportion of the nonionic component may be from about 14.5 to about 67%, preferably about 45%. A satisfactory concentrate which is highly dispersible may be formed containing 25% DDT, 72% of aromatic solvent consisting mainly of high boiling aromatics (B.P. range 300–450° F.) and 3% of the emulsifying agent.

*Example 16*

An emulsifying agent is prepared in which the nonionic component is the adduct of nonyl-phenol with 12 mols ethylene oxide and the anionic component is the aminoethyl-ethanolamine salt of polyamyl-naphthalene mono-sulfonic acid. In preparing an emulsifying agent suitable for use with the butyl ester of 2,4-D as a toxicant, the proportion of the nonionic component may be from about 35% to about 75%, preferably about 62.5%. A satisfactory concentrate which is highly dispersible and nonsludge forming is formed containing 60% butyl ester of 2,4-D, 20% methylated naphthalene, 16% kerosene and 4% of the emulsifying agent.

*Example 17*

An emulsifier is prepared in which the nonionic component is the adduct of dodecyl-mercaptan with about 11 mols ethylene oxide and the anionic component is the N-3, amino-propyl-morpholine salt of dodecyl-benzene monosulfonic acid. An emulsifying agent suitable for use with butyl ester of 2,4-D as the toxicant for the production of nonsludge forming, readily dispersible concentrates may be formed with from about 37.5% to about 67.5% of the nonionic constituent, preferably about 60%. A satisfactory concentrate which is highly dispersible and nonsludge forming is formed containing 50% butyl ester of 2,4-D, 46% kerosene and 4% of the emulsifying agent.

*Example 18*

An emulsifying agent is formed in which the nonionic component is the adduct of polypropylene-glycol of molecular weight of about 1800 with 40 mols ethylene oxide and the anionic component is the same as in the preceding example. An emulsifying agent suitable for emulsifying butyl ester of 2,4-D as a toxicant may be formed containing from about 50 to about 77% of the nonionic component, preferably about 67.5%. A satisfactory concentrate suitable for emulsifying butyl ester of 2,4-D is formed containing 50% of the toxicant, 46% kerosene and 4% of the emulsifying agent.

*Example 19*

An emulsifying agent is formed in which the nonionic component is the adduct of nonyl-phenol with 12 mols ethylene oxide and the anionic component is the 2-amino pyridine salt of dodecyl-benzene mono-sulfonic acid. An emulsifying agent suitable for use with butyl ester of 2,4-D as the toxicant may be formed with from about 16.7 to about 70% of the nonionic component, preferably about 39%. A satisfactory concentrate which is highly dispersible and nonsludge forming contains 40% of the butyl ester of 2,4-D, 57% kerosene and 3% of the emulsifying agent.

*Example 20*

An emulsifying agent is prepared in which the nonionic component is the adduct of tall oil fatty acids with 22 mols ethylene oxide and the anionic component is a mixture of the propylene diamine salt of dodecyl-benzene mono-sulfonic acid and the monoamine salts of di- and triisopropanolamine and dodecyl-benzene mono-sulfonic acid in proportions of 2.3 to 1. An emulsifying agent suitable for the emulsification of BHC (about 41.5% gamma benzene hexachloride) may be prepared containing from about 16.8% to about 91.3% of the nonionic component, preferably about 56%. A satisfactory concentrate which is highly dispersible is prepared containing 28.9% commercial BHC, 66.1% xylene and 5% of the emulsifying agent.

*Example 21*

An emulsifying agent is prepared in which the nonionic component is a mixture containing 8 parts of the adduct of nonyl-phenol with 12 mols ethylene oxide and 1 part of Tergitol XC; and the anionic component is a mixture of 4 parts of the propylene diamine salt of dodecyl-benzene sulfonic acid and 1 part of the sodium salt of mahogany petroleum sulfonate. An emulsifying agent is prepared containing 9 parts of the mixed nonionic constituents and 5 parts of the mixed anionic constituents, the emulsifying agent containing about 4 parts of inert solvents. A satisfactory concentrate which is highly dispersible is formed containing 60% Malathion, 35% xylene and 5% of the emulsifying agent.

In the foregoing examples, wherein nonsludge forming concentrates of the solutions butyl ester of 2,4-D and the described emulsifying agents are produced, similar results are secured when the butyl ester is replaced by other esters of 2,4-D or by esters of 2,4,5-T, or by solutions of butoxy-polypropoxy-propanol, or other toxicants which tend to form sludge in concentrates with organic sulfonates of polyvalent metals included in the emulsifying agent.

The commercial forms of the surface active agents which are employed in carrying out the present invention in general include a greater or less proportion of solvent or inert and inactive material. In the foregoing examples, the relative proportions of the surface active agents or emulsifiers referred to have been based upon the content of active material in the commercial products used. The mixtures of the commercial products, which necessarily contain the inert and inactive constituents present therein as well as the active surface agents, thus constitute in practice the emulsifying agent which is used in preparing the toxicant concentrate. The proportion of such emulsifying agent used may vary from about 3 to about 10% or higher, so that the proportion of emulsifying agent active constituents, may be in the order of 2% to 10% or higher. More than the amount necessary may be employed without deleterious effect, but is obviously uneconomical.

As is apparent from the foregoing examples, the relative proportions of nonionic and anionic surface active agents employed in the emulsifier in order to obtain efficient emulsification may vary somewhat with the nature of the toxicant. It will be noted that in the examples the toxicants most frequently referred to are the butyl ester of 2,4-D and Toxaphene. These toxicants are representative of those respectively in which lower and higher proportions of the nonionic component are required, many other toxicants falling in the range between these two insofar as the relative proportion of nonionic and anionic components of the emulsifying mixture are concerned. In general, the presence of an aromatic solvent for the toxicant, for example, xylene, makes desirable the presence of a higher proportion of the nonionic component in the emulsifying agent.

In preparing the mixture of emulsifying agents in accordance with the present invention, the minimum proportion of the amine salt or salts constituting the anionic component, depending upon the hardness of the water, may vary from about 4% to about 85%; and the maximum proportion, depending also upon the hardness of the water and the nature of the nonionic constituent, may vary from about 20% to about 90%, the range for the preferred products being from about 7.5% to about 75%. The procedures employed for determining the proper proportions of the anionic and nonionic components of the emulsifying agent for use with any particular toxicant and its accompanying solvent are well understood in the art and necessarily involve a certain amount of routine testing, since the most desirable proportions will vary to some extent with the specific surface active agents used and the hardness of the water, as well as with the nature of the toxicant and its solvent. Thus, the proper proportions in any particular case may be readily determined, for example, by observing the behavior when dispersed in both soft and hard water, using selected toxicant solutions, of emulsifying agents containing mixtures of the selected anionic and nonionic components in relative proportions of 10%, 25%, 50% and 75% of the nonionic component and adjusting the proportions of the components of the emulsifying agent mixture in accordance with the results of these observations.

The polyamine salts employed in accordance with the present invention as the anionic component of the mixture of anionic and nonionic surface active agents have a beneficial effect in connection with the use of emulsifying agents consisting of mixed anionic and nonionic surface active agents in which the anionic component is made up of alkali metal or polyvalent metal salts of alkyl aryl and hydroxylated alkyl aryl sulfonic acids as hitherto employed. When a substantial portion of the alkali metal or alkaline earth metal salt or other metal salt constituting the anionic component of such mixtures, say 20% or more, is replaced by the polyamine salts of similar acids, of the character hereinbefore set forth, the tendency to sludge formation is materially decreased or eliminated and the dispersibility of the concentrate formed with the emulsifying agent is not impaired and, indeed, may be improved.

Although the emulsifying agents as hereinbefore described are particularly intended for use in the dispersion of concentrates containing toxicants for agricultural and household use, as is readily apparent, they may also be employed for effecting dispersion of other oily and water-insoluble materials.

Although the present invention has been described in connection with the details of certain illustrative embodiments thereof, it is not intended that these details shall be regarded as limitations upon the scope of the invention, except insofar as included in the accompanying claims.

I claim:

1. In an emulsifying agent for use with solutions of toxicants in organic solvents to secure concentrates readily dispersible in water of varying degrees of hardness, which emulsifying agent comprises (a) a nonionic component comprising a compound having a lipophilic group containing at least 6 carbon atoms and a polyoxyalkylene radical in which there is present a polyoxyethylene chain containing from 5 to 45 oxyethylene groups to render said nonionic component water-soluble to water-dispersible, and (b) an anionic component which includes at least one salt of an alkyl aromatic sulfonic acid in which an alkyl group contains at least 5 carbon atoms, the improvement wherein at least 15% of the salts of the said aromatic sulfonic acids constituting the anionic component are salts of polyamines having 2 to 4 carbon atoms between amine groups.

2. An emulsifying agent as set forth in claim 1, wherein said anionic component is a polyamine salt of an alkyl benzene mono-sulfonic acid having from 8 to 18 carbon atoms in an alkyl group.

3. An emulsifying agent as set forth in claim 1, wherein said anionic component is a polyamine salt of an alkyl benzene-monosulfonic acid having mainly 12 carbon atoms in an alkyl group, and in which the nonionic component is a polyglycol ether of a nonyl phenol containing from about 10 to about 20 oxyethylene groups.

4. An emulsifying agent as set forth in claim 1, wherein said anionic component is a polyamine salt of an alkyl benzene-monosulfonic acid having mainly 12 carbon atoms in an alkyl group, and in which the nonionic component is a polyoxyethylene ester of tall oil fatty acids containing from about 5 to about 22 oxyethylene groups.

5. An emulsifying agent as set forth in claim 1, wherein said anionic component is a polyamine salt of an alkyl benzene-monosulfonic acid having mainly 12 carbon atoms in an alkyl group, and in which the nonionic component is a butyl alcohol-propylene oxide-ethylene oxide adduct having a molecular weight between about 600 and 2000.

6. An emulsifying agent for use with solutions of toxicants in organic solvents to secure concentrates readily dispersible in water of varying degrees of hardness, said emulsifying agent containing as one component a nonionic surface active agent which is polyalkylene oxide adduct of an organic compound having a terminal group containing a reactive hydrogen atom, selected from the class consisting of alkyl monohydric and polyhydric alcohols, polypropylene oxides, mono-ethers of polypropylene glycol and polybutylene glycol with hydroxy-alkyl, hydroxy-aryl and hydroxy-alkyl-aryl compounds, fatty acids, fatty acid amides, alkyl sulfamides, alkyl mercaptans, partial fatty acid esters of polyhydric alcohols, alkylated phenols and hydroxy-alkyl-aryl compounds, said organic compound having at least one lipophilic group containing at least 6 carbon atoms and having not more than 2 aromatic rings and the polyalkylene oxide portion of said nonionic surface active agent containing 4 to 40 alkylene oxide groups of which there are sufficient ethylene oxide groups to render said nonionic surface active agent water-soluble to water-dispersible, and said emulsifying agent also containing as another component an anionic surface active agent which is a salt of an organic sulfonic acid selected from the group consisting of the preferentially oil soluble petroleum sulfonic acids and the alkylated aromatic sulfonic acids of the general formula

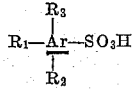

wherein Ar represents an aromatic radical having not more than two rings, $R_1$ represents a radical having at least 5 carbon atoms selected from the group consisting of the alkyl, polyalkyl, alkoxy, alkyl phenyl, alkyl thio and polypropoxyether radicals, $R_2$ a member selected from the group consisting of the alkyl, phenyl, hydroxy phenyl, phenyloxy and benzyl radicals, hydrogen and halogen, the total number of carbon atoms in $R_1$ plus $R_2$ being from 8 to 30, and $R_3$ a member selected from the group consisting of hydrogen and hydroxyl; and a polyamine having 2 to 4 carbon atoms between the amine groups, and selected from the group consisting of the alkylene polyamines, alkyl substituted alkylene polyamines, alkanol substituted alkylene polyamines, hydroxyalkylene-polyamines, amino-hydro-oxazines, alkyl-substituted amino-hydro-oxazines and amino-substituted mono- and dinuclear heterocyclic amines having at least 1 nitrogen in the ring and at least 1 amino group attached to a carbon atom of the ring, the said nonionic and anionic surface agents together being present in proportions to effect dispersion of the toxicant, the proportion of amine salts in the mixture of nonionic and anionic surface agents being within the range of 4 to 90%, on the basis of active ingredients.

7. In a toxicant-containing composition which is readily dispersible in water of varying hardness, said composition being of the type containing a toxicant, an organic solvent therefor and an emulsifying agent which includes as components nonionic and anionic surface active agents proportioned to impart the required dispersibility in water of given hardness, said nonionic surface active agent comprising a compound having a lipophilic group containing at least 6 carbon atoms and a polyoxyalkylene radical in which there is present a polyoxyethylene chain containing from 5 to 45 oxyethylene groups to render said nonionic surface active agent water-soluble to water-dispersible, the improvement wherein at least a substantial part of the anionic component of the emulsifying agent is a salt of an organic sulfonic acid selected from the group consisting of the preferentially oil soluble petroleum sulfonic acids and the alkylated aromatic sulfonic acids of the general formula

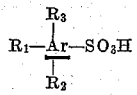

wherein Ar represents an aromatic radical having not more than two rings, $R_1$ represents a radical selected from the group consisting of the alkyl, polyalkyl, alkoxy, alkyl phenyl, alkyl thio and polypropoxyether radicals having at least 5 carbon atoms, $R_2$ a member selected from the group consisting of the alkyl, phenyl, hydroxy phenyl, phenyloxy and benzyl radicals, hydrogen and halogen, the total number of carbon atoms in $R_1$ plus $R_2$ being from 8 to 30, and $R_3$ a member selected from the group consisting of hydrogen and hydroxyl, and a polyamine having 2 to 4 carbon atoms between the amine groups, and selected from the group consisting of the alkylene polyamines, alkyl substituted alkylene polyamines, alkanol substituted alkylene polyamines, hydroxyalkylene-polyamines, amino-hydro-oxazines, alkyl-substituted amino-hydro-oxazines and amino-substituted mono- and dinuclear heterocyclic amines having at least 1 nitrogen in the ring and at least 1 amino group attached to a carbon atom of the ring.

8. A toxicant composition as set forth in claim 7, wherein an anionic component of the emulsifying agent is a polyamine salt of an alkyl-substituted aryl monosulfonic acid having at least one alkyl group with 9 to 22 carbon atoms and a monocyclic aryl radical.

9. A toxicant composition as set forth in claim 7, wherein an anionic component of the emulsifying agent is a polyamine salt of a preferentially oil soluble petroleum sulfonic acid.

10. A toxicant composition as set forth in claim 7, wherein the toxicant is selected from the class consisting of esters of 2,4-D, esters of 2,4,5-T, chlorinated camphene, and butoxy-polypropoxy-propanol.

11. A toxicant composition as set forth in claim 7 wherein a nonionic component of the emulsifying agent is a polyoxyethylene adduct of an alkyl-phenol having 6 to 25 carbon atoms in the alkyl group, said adduct having from 8 to 40 oxyethylene groups.

12. A toxicant composition which is readily dispersible in water of varying hardness, said composition containing as its principal constituent a solution of a toxicant in an organic solvent together with an emulsifying agent containing a water-soluble to water-dispersible nonionic component which is a polyoxyethylene adduct of an alkyl phenol having at least one alkyl group with 8 to 18 carbon atoms, said adduct containing from 8 to 30 oxyethylene groups, and an anionic component which is a salt of an alkyl aryl sulfonic acid having at least one alkyl group with 8 to 18 carbon atoms and an alkylene polyamine having 2 to 4 carbon atoms between the amine groups, the nonionic and anionic components of said emulsifying agent being in proportions to effect rapid dispersion of the toxicant in water of given hardness, the proportion of nonionic component in the mixture of nonionic and anionic components in said emulsifying agent being from about 28% to about 75%, basis active ingredient.

13. A toxicant composition as set forth in claim 12 wherein the amine salt in the emulsifying agent is the propylene-diamine salt of dodecyl-benzene monosulfonic acid.

14. A toxicant composition as set forth in claim 12 wherein the toxicant is selected from the group consisting of esters of 2,4-D, 2,4,5-T, chlorinated camphene, and butoxy-polypropoxy-propanol.

15. A toxicant composition which is readily dispersible in water of varying hardness, said composition containing as its principal constituent a solution of a toxicant in an organic solvent together with an emulsifying composition having a nonionic component which contains a polyoxyalkylene adduct of an aliphatic lipophile compound containing an alkyl group having from 8 to 22 carbon atoms, said adduct containing from 8 to 30 oxyethylene groups and having an anionic component which contains an alkylene polyamine salt of an alkylated aryl monosulfonic acid, at least one alkyl group in said alkylated aryl sulfonic acid having 9 to 18 carbon atoms and the aryl component of said sulfonic acid having not more than two aromatic rings, the nonionic and anionic components of said emulsifying composition being present in portions to effect rapid dispersion of the toxicant in water of given hardness, the proportion of nonionic component in the mixture of emulsifying components in the emulsifying composition being in the range of from about 15% to about 95%.

16. A toxicant composition as set forth in claim 15 wherein the amine salt in the emulsifying agent is the propylene diamine salt of dodecyl-benzene monosulfonic acid.

17. A toxicant composition as set forth in claim 15 wherein the toxicant is selected from the group consisting of esters of 2,4-D, 2,4,5-T, chlorinated camphene, and butoxy-polypropoxy-propanol.

18. A toxicant composition which is readily dispersible in water of varying hardness, said composition containing as its principal constituent a toxicant in solution in an organic solvent immiscible with water, together with an emulsifying agent containing as a nonionic surface active component a water-soluble to water-dispersible polyethylene oxide adduct of nonyl-phenol having 12 to 15 ethylene oxide groups and as an anionic component a propylene-diamine salt of an aromatic sulfonic acid selected from the group consisting of dodecyl-benzene monosulfonic acid and dodecyl-phenol monosulfonic acid, said components being present in said emulsifying agent in proportions to secure rapid dispersion of the toxicant solution in water of given hardness.

19. A toxicant composition as set forth in claim 18 wherein the toxicant is selected from the group consisting of esters of 2,4-D, 2,4,5-T, chlorinated camphene, and butoxy-polypropoxy-propanol.

References Cited in the file of this patent

UNITED STATES PATENTS

| 2,055,588 | Pospiech | Sept. 29, 1936 |
| 2,223,935 | Daniels | Dec. 3, 1940 |
| 2,344,539 | De Groote | Mar. 21, 1944 |
| 2,543,852 | Jaccard | June 6, 1951 |
| 2,653,136 | Hughes | Sept. 22, 1953 |
| 2,731,338 | Fike | Jan. 17, 1956 |